P. SHISHKOFF.
REGULATING AND CONTROLLING THE TRANSMISSION OF POWER.
APPLICATION FILED JULY 2, 1920.

1,381,354.

Patented June 14, 1921.
2 SHEETS—SHEET 1.

Inventor.
Paul Shishkoff,
By Howard A. Coombs.
Attorney

P. SHISHKOFF.
REGULATING AND CONTROLLING THE TRANSMISSION OF POWER.
APPLICATION FILED JULY 2, 1920.

1,381,354.

Patented June 14, 1921.

Inventor.
Paul Shishkoff,

By Howard J. Coombs.

Attorney

UNITED STATES PATENT OFFICE.

PAUL SHISHKOFF, OF RICHMOND, ENGLAND.

REGULATING AND CONTROLLING THE TRANSMISSION OF POWER.

1,381,354.

Specification of Letters Patent.   Patented June 14, 1921.

Application filed July 2, 1920.   Serial No. 393,685.

*To all whom it may concern:*

Be it known that I, PAUL SHISHKOFF, a Russian subject, residing at 50 The Vineyard, Richmond, Surrey, England, have invented an Improvement for Regulating and Controlling the Transmission of Power, of which the following is a specification.

This invention relates to improvements in mechanism for controlling and regulating the transmission of power.

One application of this invention is to windmills or wind motors for the purpose of controlling and regulating variable wind power and transmitting same to the translating device such as a generator or pump at a uniform rate or at a rate corresponding to the load. This invention is not limited in its application to wind mills or wind motors but may be employed in a great variety of circumstances to control and regulate the transmission of power. For instance it can be employed with an internal combustion engine in such a manner that the engine may be employed for a short time to generate power and transmit it to the mechanism of this invention to be accumulated or stored and the mechanism subsequently employed—that is to say after the source of power is rendered inoperative as a motor for driving a translating device or load.

In general the source of power may be a wind or tide motor, an internal combustion engine, an electric motor, a spring motor or any other type of prime mover.

The objects of this invention are to equalize or vary according to the load the transmission of power developed by a variable or constant source and to eliminate friction and loss of power due thereto in certain moving parts of the mechanism.

Stated broadly this invention consists of mechanism for controlling and regulating the transmission of power comprising a motor, a transmission shaft driven thereby, a free wheel clutch between the motor and shaft, a geared flywheel for accumulating and discharging energy, a variable ratio gear interposed between the transmission shaft and the wheel, a regulating device responsive to the speed of or the load on the transmission shaft and means whereby said regulating device automatically varies the ratio of the flywheel gearing. Stated more specifically this invention is characterized by the employment of a geared high speed flywheel running in a vacuum chamber and connected to the power transmission shaft by a variable friction disk driving gear and adapted to accumulate energy under normal or supernormal conditions of power and to act as motor for a prolonged period under subnormal conditions or failure of the power.

Further features of this invention reside in the details hereinafter described including the employment of a vacuum chamber in which the flywheel rotates and an air pump for maintaining a high degree of vacuum in said chamber; the employment of a friction gear for driving the flywheel and an automatic regulating device comprising a differential gear having one crown wheel driven by the transmission shaft the other crown wheel connected to a screw shaft controlling the ratio of the flywheel gearing a gear wheel carrying the differential satellite pinions and a motor driving said gear wheel and satellites in such a manner as to maintain the controlling screw shaft stationary when the power applied and the load on the system are balanced but to rotate the screw shaft when this condition alters so as to allow the flywheel to accumulate or discharge energy without altering the speed of the transmission shaft.

The accompanying drawings illustrate by way of example two forms of construction in which:—

Figure 1:
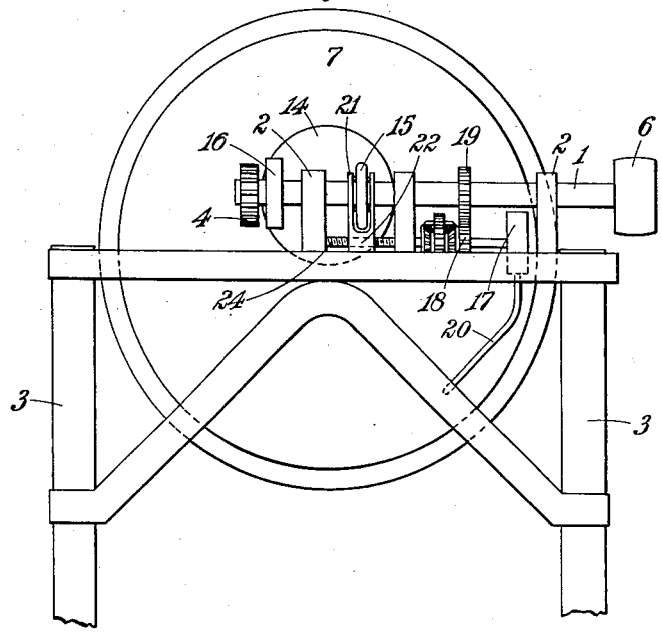
Figure 1 is a partial elevation of the mechanism.
Figure 2:
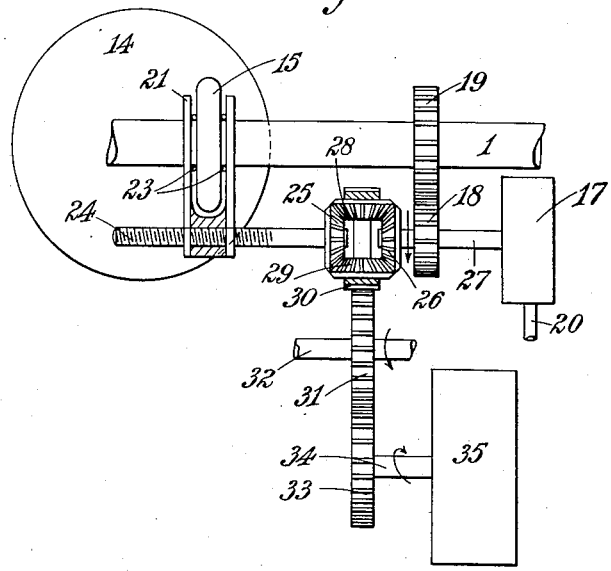
Fig. 2 is an enlarged detail of Fig. 1.
Figure 3:
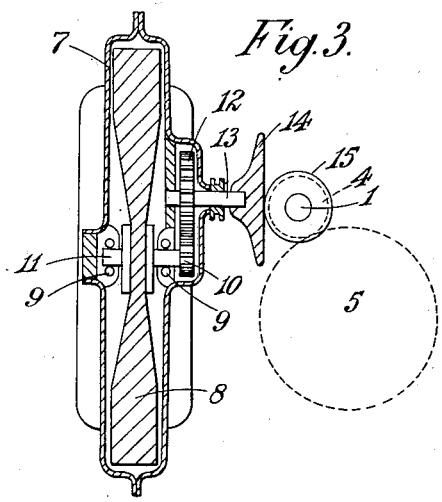
Fig. 3 is a section through the flywheel and casing.

Referring now to Figs. 1 to 3 the transmission shaft is designated 1 and mounted in bearings 2 carried by a suitable frame base or foundation 3. Shaft 1 is driven through a gear wheel 4 or the equivalent by a motor or source of power indicated at 5 in Fig. 3. A pulley 6 or the equivalent transmits power from shaft 1 to a translating device such as a pump or dynamo. The load may be directly coupled if desired.

The frame 3 carries an air-tight casing 7 in which is mounted a flywheel 8 consisting of high tensile material mounted on roller ball or other anti-friction bearings 9. A gear wheel 10 mounted on the flywheel shaft 11 meshes with a gear wheel 12 on the shaft 13 housed in the casing 7. Shaft 13 carries a disk 14 in contact with a disk 15 splined or otherwise adjustable along the axis of shaft 1. A one-way or so-called free wheel clutch is indicated diagrammatically at 16 whereby power is transmitted to shaft 1 in one direction of rotation only whereas the shaft may be rotated when necessary at a greater speed than gear 4 and independently thereof.

So far the operation of the arrangement above described is as follows. Power from the motor or source 5 is transmitted through clutch 16 and shaft 1 rotated whereupon friction disk 15 drives disk 14 and through gears 12 and 10 speeds up the flywheel 8. The speed of the flywheel is as high as is compatible with the strength of the materials employed and the circumstances of the case but in any case is very much greater than that of shaft 1. When the flywheel is running at speed the amount of energy accumulated or stored therein is relatively large.

In order to diminish the air resistance experienced by the flywheel the casing 7 is evacuated. To this end an air pump 17 is driven from shaft 1 through gears 18 and 19 and the intake of the pump connected by a pipe 20 with the interior of the casing. When the set is running pump 17 maintains a high degree of vacuum in the flywheel casing.

Assuming the source of power 5 to be a wind motor then the power will vary considerably at times but it is necessary to apply power at pulley 6 at a uniform rate or alternatively whether the power from the source 5 be variable or fairly constant it may be necessary to increase the power applied at pulley 6 in response to increase in the load. In either case the energy in the flywheel is employed to supply power to balance the load on pulley 6. At starting the flywheel is run up to speed and the load then put on shaft 1. If the power applied and the load on the shaft are balanced friction disk 15 is in a predetermined position on shaft 1 where it contacts with disk 14. Should the power applied diminish or fail then disk 15 is moved automatically toward the periphery of disk 14 and the flywheel then acts as motor taking up the load on shaft 1. As the speed of the flywheel falls so disk 15 moves farther toward the periphery of disk 14 thus maintaining a fairly uniform speed of and application of power to shaft 1. The reverse operation takes place when the power applied is greater than the load that is to say disk 15 moves toward the center of disk 14 thus speeding up the flywheel and balancing the load with the power applied.

The automatic regulator controlling disk 15 will now be described. A yoke 21 carried by a nut 22 embraces disk 15 and is provided with thrust bearings 23 as shown. The nut 22 is mounted on a screw shaft 24 mounted to rotate in the bearing columns 2. One crown wheel 25 of a differential gear is mounted on shaft 24 while the other crown wheel 26 is mounted on the pump shaft 27. The satellites 28 and 29 are mounted in a gear ring or wheel 30 which meshes with a gear 31 on a suitably mounted stub shaft 32. Wheel 31 is driven by wheel 33 on the shaft 34 of a motor 35.

The operation of the regulator is as follows. Assuming motor 35 to be a constant speed motor such as a shunt wound electric motor or a water turbine or a spring motor then its speed is such that the orbital rotation of the satellites due to the rotation of crown wheel 26 is nullified by the gears 33 and 31 rotating the gear wheel or ring 30 in the opposite direction. Consequently crown wheel 25 remains stationary and this is the condition when the power applied to shaft 1 and the load on pulley 6 are balanced. Failure or diminution of the source of power 5 will cause shaft 1 to slow down and immediately change the speed relationship between crown wheel 26 and gear 31 with the result that crown wheel 25 begins to rotate and causes nut 22 to move disk 15 toward the periphery of disk 14 and thereby increase or maintain the speed of shaft 1 which then takes power from the flywheel. The reverse action takes place when source 5 supplies an excess of power.

Motor 35 need not necessarily be a constant speed motor. It may for instance be a series wound electric motor the speed of which varies with the load in which case the action described above will result. Again where the load is electrical motor 35 may be of the shunt wound type fitted with a field regulator responsive to the load in order to vary the speed and thus effect automatic regulation.

Figure 4:
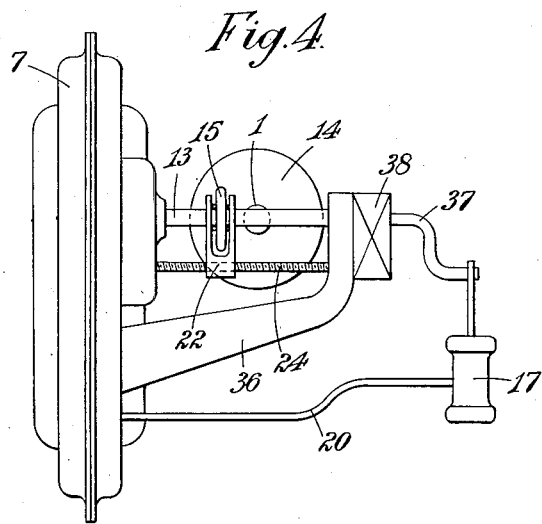
Fig. 4 is an elevation of a modified arrangement of the parts.

Referring now to the modification shown in Fig. 4 like parts already referred to hereinbefore are designated by like reference numerals. In this case the disk 14 is mounted on the transmission shaft 1 while disk 15 is splined to and slides on shaft 13. To this end casing 7 is provided with a bracket or arm 36 in which one end of shaft 13 is journaled. Shaft 13 also drives the pump 17 as indicated diagrammatically by the crank 37. The regulator is indicated at 38.

The regulator may be of any type in which any change in the magnitude of the load or application of power initiates or accomplishes an adjustment of the position of the variable flywheel gearing so as to balance the load and power.

I claim:—

1. Mechanism for controlling and regulating the transmission of power comprising in combination a motor, a transmission shaft driven thereby, a free-wheel clutch interposed between said motor and said transmission shaft, a geared flywheel serving to accumulate and discharge energy, a variable ratio gear interposed between said transmission shaft and said flywheel, a regulating device responsive to the load on the transmission shaft and means whereby said regulating device automatically varies the ratio of the flywheel gearing.

2. Mechanism for controlling and regulating the transmission of power comprising in combination a source of power, a transmission shaft driven thereby, a one-way clutch interposed between said source and said shaft, a high speed flywheel, a vacuum casing therefor, a variable ratio gear interposed between said transmission shaft and said flywheel an air pump geared to said transmission shaft, a pipe connecting the interior of said vacuum casing with the inlet to said air pump, means for varying the ratio of the flywheel gearing and a device for controlling the ratio variation of said flywheel gearing whereby the power applied and the load on the system are balanced without altering the speed of the transmission shaft.

3. Mechanism for controlling and regulating the transmission of power comprising in combination, a source of power, a transmission shaft driven thereby, a free-wheel clutch interposed between said source and shaft, a flywheel, a variable ratio friction driving gear interposed between said flywheel and transmission shaft, a regulating device responsive to the load on the transmission shaft and means whereby said regulating device controls the ratio of the flywheel gearing to balance the load and the power applied to the system.

4. Mechanism for controlling and regulating the transmission of power comprising in combination, a source of power, a transmission shaft driven thereby, a free-wheel clutch interposed between said source and shaft, a flywheel, an airtight casing therefor, an air pump driven by said transmission shaft, a pipe connecting the interior of said casing with the inlet to said air pump, a variable ratio friction driving gear interposed between said flywheel and transmission shaft, a regulating device responsive to the load on the tranmission shaft and means whereby said regulating device controls the ratio of the flywheel gearing to balance the load and the power applied to the system.

5. Mechanism for controlling and regulating the transmission of power comprising in combination a source of power, a transmission shaft, a one-way clutch interposed between the source and said shaft, a high speed flywheel geared to said transmission shaft, means whereby power applied in excess of the load is stored in said flywheel and means whereby said flywheel acts as motor when the load exceeds the power applied without altering the speed of said transmission shaft.

6. Mechanism for controlling and regulating the transmission of power comprising in combination, a source of power, a transmission shaft, a one-way clutch interposed between said source and shaft, a geared flywheel serving to accumulate and discharge energy, a variable ratio gear interposed between said transmission shaft and flywheel, a differential gear, means for driving one crown wheel from the transmission shaft a screw rod driven by the other crown wheel, a gear ring carrying the satellites of the differential gear, an auxiliary motor responsive to the load on the transmission shaft, a driving connection between said auxiliary motor and the differential gear ring whereby said gear is rotated to maintain said screw rod stationary when the power applied and the load are balanced, and means carried by said screw rod to vary the flywheel gear ratio when the power applied and the load are unbalanced and said screw rod is rotated.

7. The combination with mechanism for controlling and regulating the transmission of power of a geared high speed flywheel, a vacuum chamber therefor, means for maintaining a high degree of vacuum in said chamber, a power transmission shaft, a variable friction disk driving gear interposed between said shaft and flywheel, means whereby the flywheel is caused to accumulate energy under normal or supernormal conditions of power and means whereby said flywheel is caused to act as motor for a prolonged period under subnormal conditions or failure of the power.

PAUL SHISHKOFF.